United States Patent
Kobayashi et al.

(10) Patent No.: US 6,571,767 B2
(45) Date of Patent: Jun. 3, 2003

(54) FLOW AMOUNT CALCULATION CONTROLLER AND FLOW AMOUNT CALCULATION CONTROL METHOD

(75) Inventors: Daisuke Kobayashi, Susono (JP); Akira Ohata, Mishima (JP); Harufumi Muto, Aichi-ken (JP); Hisayo Dohta, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/978,557

(22) Filed: Oct. 18, 2001

(65) Prior Publication Data

US 2002/0046733 A1 Apr. 25, 2002

(30) Foreign Application Priority Data

Oct. 25, 2000 (JP) ........................................ 2000-326108

(51) Int. Cl.[7] ........................... F02M 51/00; F02D 41/18
(52) U.S. Cl. .................... 123/399; 73/118.2; 123/480
(58) Field of Search ................. 123/399, 361, 123/478, 480, 492, 493, 488; 73/117.2, 117.3, 118.1, 118.2

(56) References Cited

U.S. PATENT DOCUMENTS

| | | | | |
|---|---|---|---|---|
| 4,249,505 A | * | 2/1981 | Nishimura ................. | 123/587 |
| 4,860,707 A | * | 8/1989 | Ohata ....................... | 123/339.2 |
| 4,928,654 A | * | 5/1990 | Hosaka ..................... | 123/486 |
| 5,448,978 A | * | 9/1995 | Hasegawa et al. .......... | 123/480 |
| 5,520,146 A | * | 5/1996 | Hrovat et al. ............... | 123/336 |

FOREIGN PATENT DOCUMENTS

| JP | A 6-74076 | | 3/1994 | |
|---|---|---|---|---|
| JP | 130039 | * | 5/2002 | ........... F02D/41/18 |

OTHER PUBLICATIONS

Hendricks et al., "Modelling of the Intake Manifold Filling Dynamics", Society of Automotive Engineers, Inc., 960037 1996.

* cited by examiner

Primary Examiner—Tony M. Argenbright
Assistant Examiner—Hai Huynh
(74) Attorney, Agent, or Firm—Oliff & Berridge, PLC

(57) ABSTRACT

Flow amount calculation controller controls a certain subject based on a flow amount of fluid, passing through a variable throttle portion provided in an air passage, calculated from an upstream pressure Pu, an upstream density ρu, a downstream pressure Pd, an opening area Ad and a specific heat ratio k by the following formula.

$$mt = Ad \cdot (Pu \cdot \rho u)^{1/2} \cdot ((((k-1)/(2 \cdot k)) \cdot (1-Pd/Pu) + Pd/Pu) \cdot (1-Pd/Pu))^{1/2}$$

14 Claims, 6 Drawing Sheets

FLOW AMOUNT CALCULATION CONTROLLER AND FLOW AMOUNT CALCULATION CONTROL METHOD

INCORPORATION BY REFERENCE

The disclosure of Japanese Patent Application No. 2000-326108 filed on Oct. 25, 2000, including the specification, drawings and abstract is incorporated herein by reference in its entirety.

BACKGROUND OF THE INVENTION

1. Field of the Invention

The invention relates to a flow amount calculation controller and a flow amount calculation control method for calculating a flow amount of fluid passing through a variable throttle portion provided in an air passage.

2. Description of Related Art

As a related technical method for calculating a flow amount of a fluid flowing through an air passage, there has been conventionally known an intake air amount calculating method for calculating an air amount sucked into a cylinder of an internal combustion engine through an intake pipe provided with a throttle valve as described in Japanese Patent Application Laid-open 6-74076. According to the method, the amount of air passing it through corresponding to a throttle opening is calculated based on a hydrodynamic formula by assuming the throttle valve as an orifice.

This flow amount calculating method improves an estimated accuracy of the flow amount by employing an actual pressure when calculating the flow amount, and makes a calculation in such a manner that an estimation error in the flow amount calculation does not affect the next estimation and calculation.

However, since the flow amount calculating method employs a relational expression of an adiabatic change, the flow amount is calculated on the assumption that an isentropic condition is established in the flowing fluid. Accordingly, this calculating method has a problem that an accurate flow amount can not be calculated under a condition where the isentropic condition is not established. In particular, in the case of calculating an amount of air flowing through an intake pipe of an internal combustion engine, the isentropic condition is not always established, so that it is hard to calculate an accurate amount of air.

SUMMARY OF THE INVENTION

For solving the problem mentioned above, it is an object of the invention to provide a flow amount calculation controller which can accurately calculate a flow amount of fluid flowing through an air passage, and a method of the same.

That is, a flow amount calculation controller according to the invention controls a certain subject based on a flow amount of fluid, passing through a variable throttle portion provided in an air passage, calculated by employing a mass conservation rule, an energy conservation rule and a momentum conservation rule from an upstream pressure of the variable throttle portion, an upstream density of the variable throttle portion, a downstream pressure of the variable throttle portion, an opening area of the variable throttle portion and a specific heat ratio of the fluid. In particular, when the flow amount of the fluid passing through the variable throttle portion is represented by mt, the opening area of the variable throttle portion is represented by Ad, the upstream pressure in the upstream side of the variable throttle portion in the air passage is represented by Pu, the upstream density in the upstream side of the variable throttle portion in the air passage is represented by ρu, the downstream pressure in the downstream side of the variable throttle portion in the air passage is represented by Pd, and the specific heat ratio of the fluid is represented by k, the flow amount mt of the fluid is calculated by the following formula.

$$mt = Ad \cdot (Pu \cdot \rho u)^{1/2} \cdot ((((k-1)/(2 \cdot k)) \cdot (1 - Pd/Pu) + Pd/Pu) \cdot (1 - Pd/Pu))^{1/2}$$

According to these inventions, the flow amount of the fluid is calculated without being based on the relational expression of an adiabatic change. Therefore, it is possible to accurately calculate the flow amount of the fluid even under a condition where the isentropic condition is not established.

DESCRIPTION OF THE PREFERRED EMBODIMENT

Figure 1:
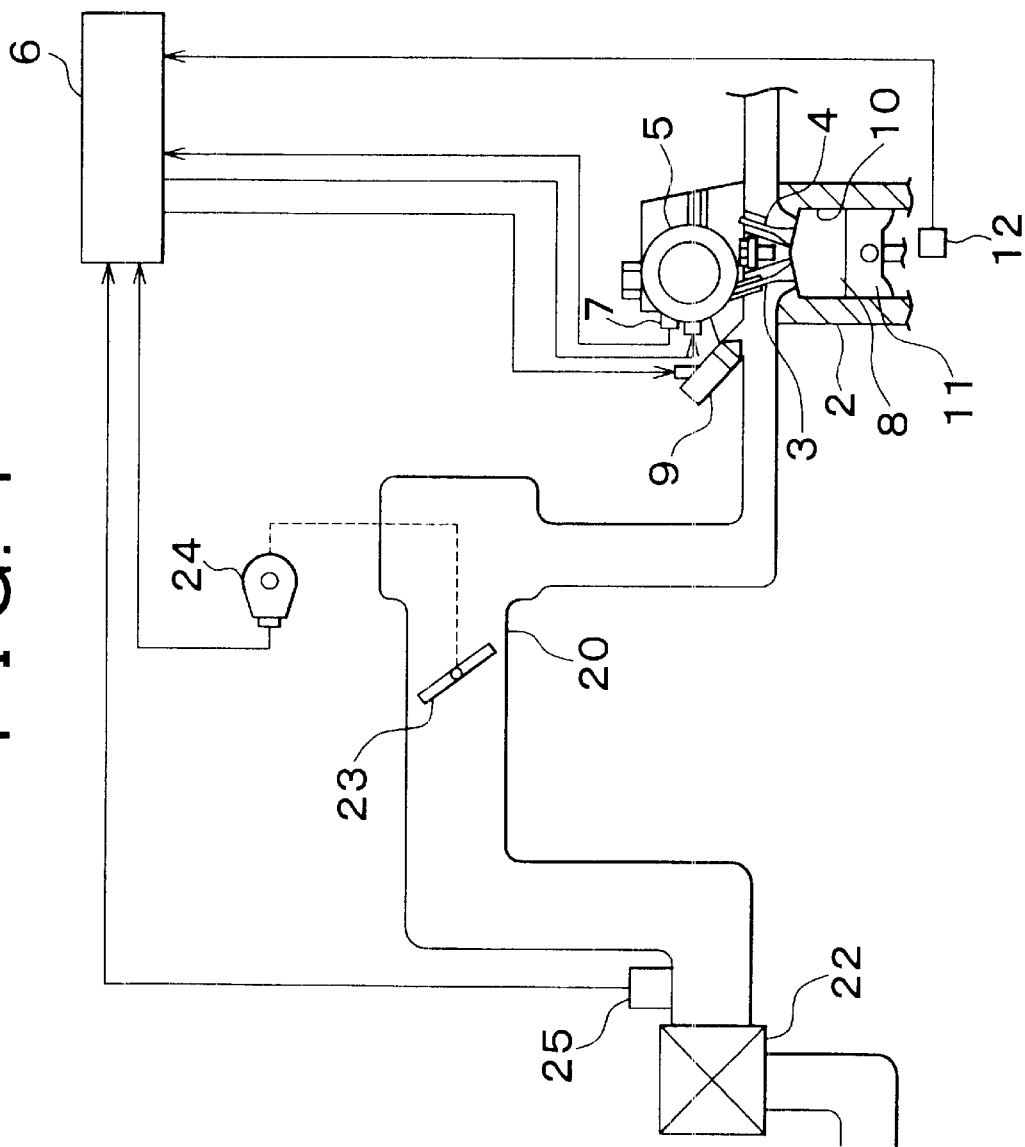
FIG. 1 is a schematic view of a flow amount calculation controller according to a first embodiment of the invention.

Now referring to the attached drawings, embodiments according to the invention will be described in detail. In this case, the same reference numerals are attached to the same elements in the description of the drawings, and an overlapping description will be omitted.

(First Embodiment)

FIG. 1 is a schematic view of a flow amount calculation controller according to the first embodiment.

As shown in this drawing, the flow amount calculation controller according to the present embodiment is applied to a calculation of an amount of air passing through a throttle valve 23 of an intake pipe 20 in an engine 2. The engine 2 is provided with an adjustable valve mechanism, for example, provided with a variable valve timing mechanism 5 changing an opening and closing timing of an intake valve 3 and an exhaust valve 4.

The variable valve timing mechanism 5 is electrically connected to an ECU 6, and is operated based on a control signal output from the ECU 6. Further, the variable valve timing mechanism 5 outputs a detection signal concerning a valve timing to the ECU 6 via a detection sensor 7 such as a cam position sensor or the like.

A crank position sensor 12 is provided in the engine 2. The crank position sensor 12 is a sensor for detecting an engine speed, and is connected to the ECU 6 to output a detection signal to the ECU 6.

An injector 9 for injecting a fuel to a combustion chamber 8 is provided in the engine 2. The injector 9 is a fuel injecting means for supplying a fuel to the combustion chamber 8, and is installed in each of cylinders 10 provided in the engine 2. The combustion chamber 8 is formed above a piston 11 arranged within the cylinder 10. The intake valve 3 and the exhaust valve 4 are arranged in an upper portion of the combustion chamber 8.

An intake pipe 20 constituted by an intake manifold or the like is connected to an upstream side of the intake valve 3. An air cleaner 22 is installed in an upstream side of the intake pipe 20. Further, a throttle valve 23 is provided in the intake pipe 20.

The throttle valve 23 is a variable throttle portion provided in the intake passage, operates based on a control signal of the ECU 6 so as to change a throttle opening, and changes an opening area of the intake passage in accordance therewith. The throttle opening of the throttle valve 23 is detected by a throttle position sensor 24 and is inputted to the ECU 6.

An air flow meter 25 is provided at a downstream position of the air cleaner 22. The air flow meter 25 is an intake air amount detecting means for detecting an amount of intake air. A detection signal of the air flow meter 25 is inputted to the ECU 6.

The ECU 6 controls the entire flow amount calculation controller, and is mainly constituted by a computer including CPU, ROM and RAM. Various kinds of control routines including a flow amount calculation routine are stored in the ROM.

Next, an operation of the flow amount calculation controller according to the present embodiment will be described.

Figure 2:
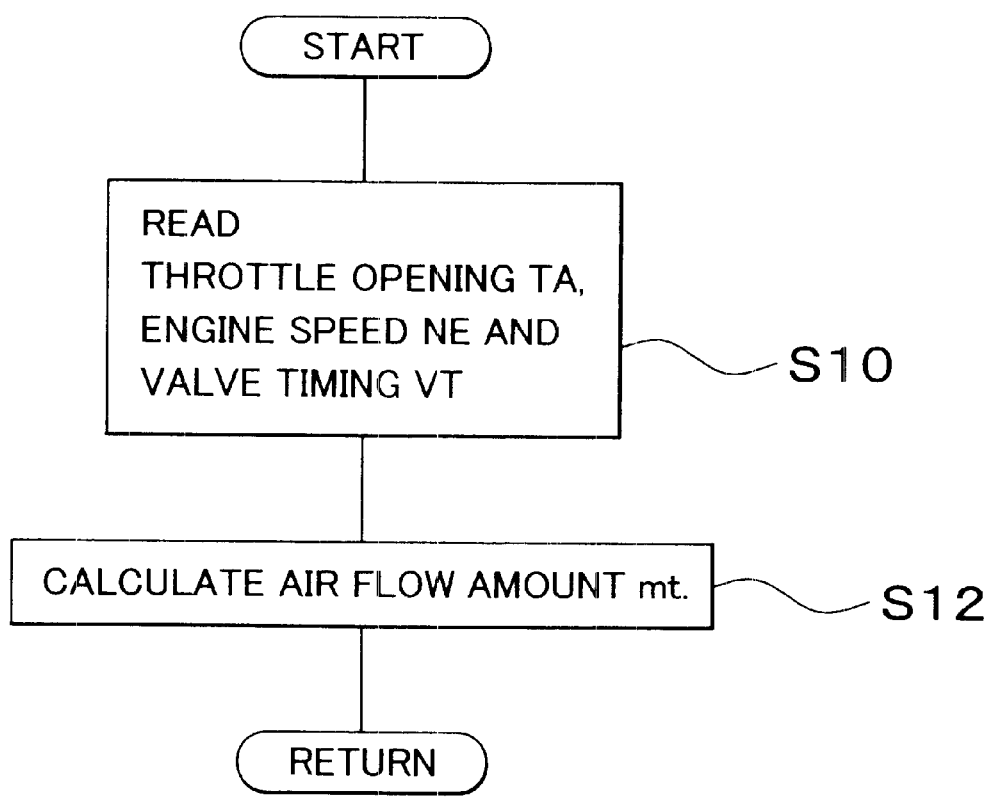
FIG. 2 is a flow chart showing an operation of the flow amount calculation controller shown in FIG. 1.

FIG. 2 is a flow chart showing an operation of the flow amount calculation controller.

In a step S10 (hereinafter, simply referred to as "S10", the same manner will be applied to the other steps) in this drawing, a throttle opening TA, an engine speed NE and a valve timing VT are read.

The throttle opening TA is read based on an output signal of the throttle position sensor 24. The engine speed NE is read based on an output signal of the crank position sensor 12. The valve timing VT is read based on an output signal of the detection sensor 7.

Then, the step goes to S12, the flow amount mt of the air passing through the throttle valve 23 of the intake pipe 20 is calculated. The air flow amount mt is calculated based on the following formula (1).

$$mt = Ad \cdot (Pu \cdot \rho u)^{1/2} \cdot \phi(Pd/Pu) \quad (1)$$

where a function $\phi(Pd/Pu)$ is $(k/(2 \cdot (k+1)))^{1/2}$ when a relation $(Pd/Pu) \leq (1/(1+k))$ is established, and is $((((k-1)/(2 \cdot k)) \cdot (1-Pd/Pu) + Pd/Pu) \cdot (1-Pd/Pu))^{1/2}$ when a relation $(Pd/Pu) > (1/(1+k))$ is established.

Further, reference symbol Ad denotes an opening area at a position of the throttle valve 23 of the intake pipe 20. Reference symbol Pu denotes an upstream pressure in an upstream side of the throttle valve 23 of the intake pipe 20. Reference symbol $\rho u$ denotes an upstream density in an upstream side of the throttle valve 23 of the intake pipe 20. Reference symbol Pd denotes a downstream pressure in a downstream side of the throttle valve 23 of the intake pipe 20. Reference numeral k denotes a specific heat ratio of the intake air.

The air flow amount mt is particularly calculated, for example, in the following manner.

Since the air flow amount and the intake pipe pressure are definitely determined when the engine 2 is under a steady state, the following formula (2) is established based on the formula (1) mentioned above when setting a steady flow amount at this time to $mt_{TA}$ and setting a steady pressure to $Pd_{TA}$.

$$mt_{TA} = Ad \cdot (Pu \cdot \rho u)^{1/2} \cdot \phi(Pd_{TA}/Pu) \quad (2)$$

where the formula (1) is established in a transient state other than the steady state, and a treatment is executed on the assumption that $Ad \cdot (Pu \cdot \rho u)^{1/2}$ is not dependent upon a differential pressure between the upstream pressure and the downstream pressure at the same throttle opening in the formulas (1) and (2). When deleting $Ad \cdot (Pu \cdot \rho u)^{1/2}$ in accordance with the formulas (1) and (2), the following formula (3) is obtained.

$$mt = mt_{TA} \cdot \phi(Pd/\rho u)/\phi(Pd_{TA}/Pu) \quad (3)$$

Further, $mt_{TA}$ and $\phi(Pd_{TA}/Pu)$ in the steady state can be determined by the throttle opening TA, the engine speed NE and the valve timing VT. Accordingly, $mt_{TA}/\phi(Pd_{TA}/Pu)$ is set as a table of the throttle opening TA, the engine speed NE and the valve timing VT, and $\phi(Pd/Pu)$ is set as a table of Pd.

Accordingly, it is possible to calculate the flow amount mt of the air passing through the throttle valve 23 by using the formula (3) in accordance with the throttle opening TA, the engine speed NE and the valve timing VT.

In this case, in the calculation of the air flow amount mt mentioned above, the air flow amount mt in the transient state may be calculated by respectively setting $mt_{TA}$ and $P_{TA}$ in the steady state as the table of the throttle opening TA, the engine speed NE and the valve timing VT, setting $\phi(Pd/Pu)$ as the table of Pd and referring to Pd and $Pd_{TA}$.

Further, in the case where the engine 2 is under the steady state, the amount of air passing through the throttle opening TA is equal to the amount of air sucked into the engine 2, so that $Pd_{TA}$ is set as the table of the throttle opening TA, the engine speed NE, and the valve timing VT. Then, the air flow amount mt in the transient state may be calculated by setting $mt_{TA}$ by a charging efficiency, setting $\phi(Pd/Pu)$ as the table of Pd and referring to Pd and $Pd_{TA}$.

Further, the downstream pressure Pd may be obtained by using an actually measured value by providing with a pressure sensor in the intake pipe 20. Further, the downstream pressure Pd may be determined based on estimation from a detected value of the air flow meter 25 or the like. Further, the table of $\phi(Pd/Pu)$ may be structured such that an argument is Pd or Pd/Pu.

Next, a calculation result in the flow amount calculation controller according to the present embodiment will be explained.

Figure 3:
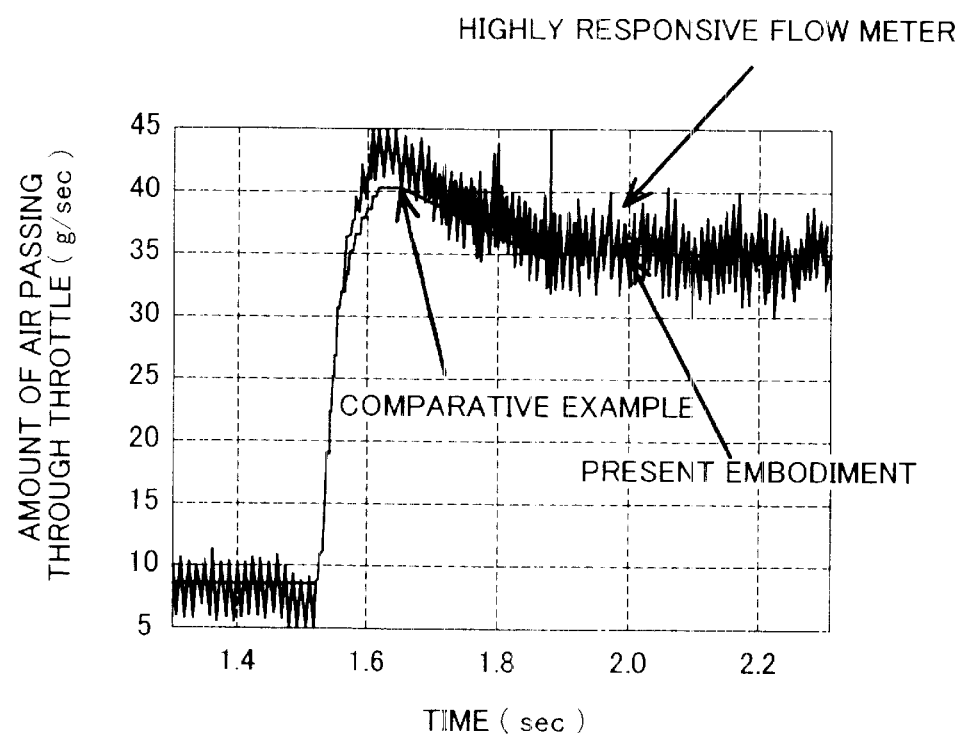
FIG. 3 is a graph showing a calculation result of the flow amount calculation controller shown in FIG. 1.
Figure 4:
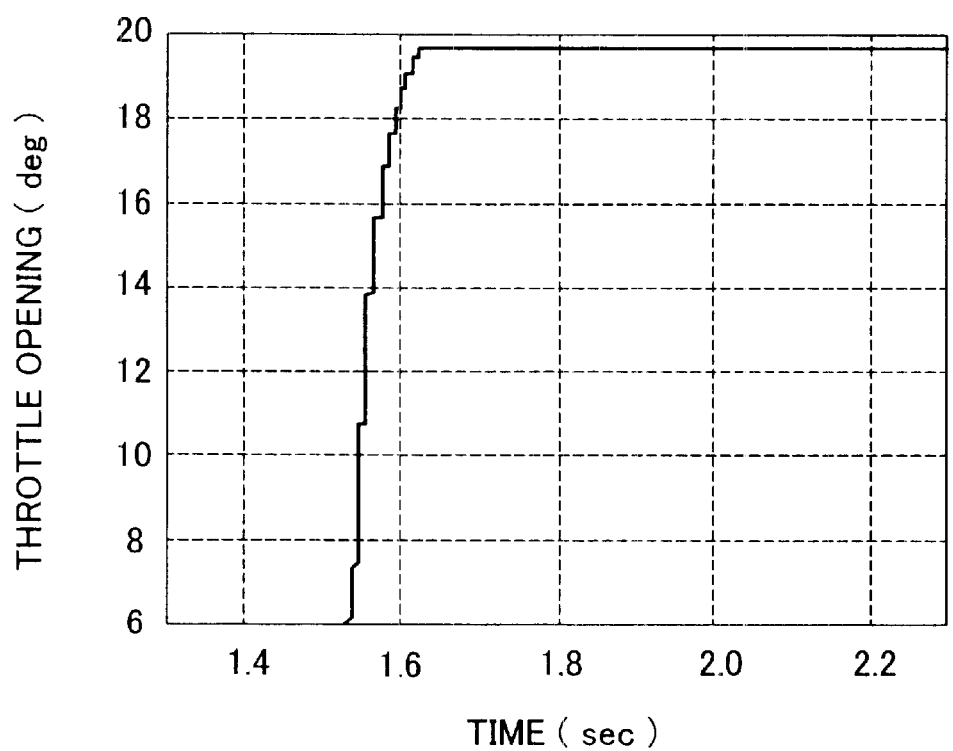
FIG. 4 is a graph showing a change of a throttle opening in FIG. 3.
Figure 5:
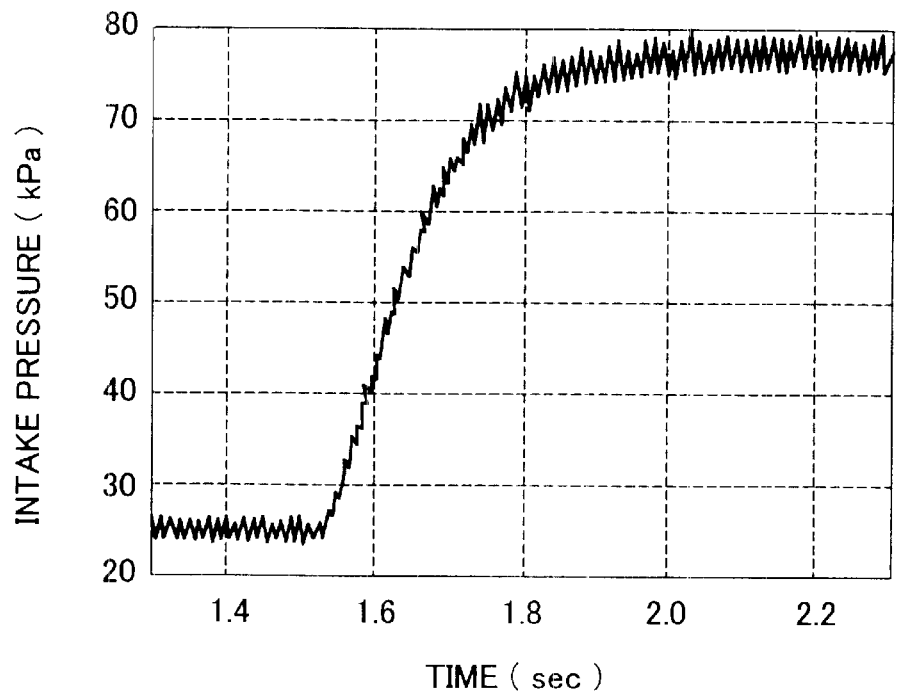
FIG. 5 is a graph showing a change of intake pressure in FIG. 3.

FIG. 3 shows a calculation result of the amount of the air passing through the throttle in the flow amount calculation controller according to the present embodiment, a calculation result of the amount of the air passing through the throttle in the flow amount calculation controller according to a comparative example and an actually measured result of a highly responsive flow meter. FIG. 4 shows a change in time lapse of the throttle opening in the calculation shown in FIG. 3, and FIG. 5 shows a change in time lapse of an intake pipe pressure (an intake pressure).

As shown in FIG. 3, the calculation result in the flow amount calculation controller according to the present embodiment well follows the actually measured value of the highly responsive flow meter, and it is known that the flow amount is accurately calculated. On the contrary, the calculation result in the flow amount calculation controller according to the comparative example does not follow the actually measured value of the highly responsive flow meter at a portion where the amount of the passing air increases suddenly, and it is known that the flow amount is not accurately calculated.

In this case, the flow amount calculation controller according to the comparative example employs a structure which calculates the amount mt of the air passing through the throttle based on the following formula (4).

$$mt = Ad \cdot (Pu \cdot \rho u)^{1/2} \cdot \phi 1(Pd/Pu) \quad (4)$$

where a function $\phi 1(Pd/Pu)$ is $(2/(k+1))^{1/(k-1)} \cdot (2 \cdot k/(k+1))^{1/2}$ when a relation $(Pd/Pu) \leq (2/(k+1))^{k/(k-1)}$ is established, and is $((2 \cdot k/(k-1)) \cdot ((Pd/Pu)^{2/k} - (Pd/Pu)^{(k+1)/k}))^{1/2}$ when a relation $(Pd/Pu) > (2/(1+k))^{k/(k-1)}$ is established.

The formula of calculation according to the comparative example is a formula introduced from a mass conservation rule (a formula (5)), an energy conservation rule (a formula (6)) and a relational expression of an adiabatic change (a formula (7)) on the assumption that an isentropic condition is established.

$$Au \cdot \rho u \cdot vu = Ad \cdot \rho d \cdot vd \quad (5)$$

$$vu^2/2 + (k/(k-1)) \cdot (Pu/\rho u) = vd^2/2 + (k/(k-1)) \cdot (Pd/\rho d) \quad (6)$$

$$Pu/\rho u^k = Pd/\rho d^k \quad (7)$$

where reference symbol ρd denotes a downstream density in a downstream side of the throttle valve 23 in the intake pipe 20. Reference numeral vu denotes an air flow velocity in the upstream side of the throttle valve 23. Reference numeral vd denotes an air flow velocity in the downstream side of the throttle valve 23. On the contrary, the flow amount calculation controller according to the present embodiment calculates the amount mt of the air passing through the throttle based on the formula (1) mentioned above. The formula (1) is introduced from the mass conservation rule (the formula (5)), the energy conservation rule (the formula (6)) which are mentioned above and the following momentum conservation rule (a formula (8)).

$$\rho d \cdot vd^2 \cdot Ad - \rho u \cdot vu^2 \cdot Au = Pu \cdot Au - Pd \cdot Ad + p \cdot (Ad - Au) \quad (8)$$

where reference symbol p denotes an average pressure in the entire upstream of the throttle valve 23.

Figure 6:
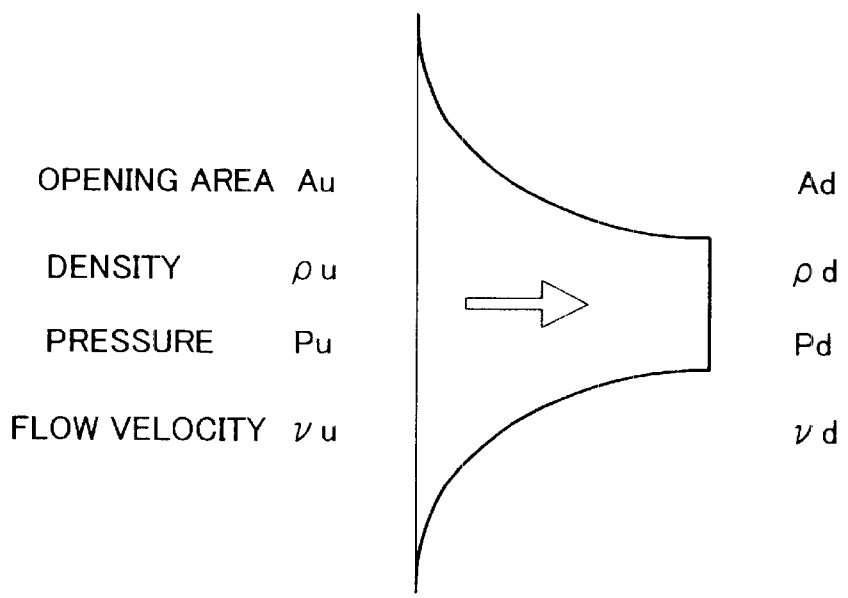
FIG. 6 is a schematic view of a calculation formula in the flow amount calculation controller in FIG. 1.

As shown in FIG. 6, on the assumption that the opening area Au in the upstream side is infinite when the opening area in the upstream side of the throttle valve 23 is represented by Au, the density in the upstream side is represented by ρu, the pressure in the upstream side is represented by Pu and the flow velocity in the upstream side is represented by vu, and the opening area of the throttle valve 23 is represented by Ad, the density in the downstream side of the throttle valve 23 is represented by ρd, the pressure in the downstream side is represented by Pd and the flow velocity in the downstream side is represented by vd, an equation vu=0 is established according to the mass conservation rule in the formula (5).

Further, taking an equation vu=0 into consideration according to the momentum conservation rule in the formula (8), an equation p=Pu is established. Accordingly, the momentum conservation rule satisfies an equation $\rho d \cdot vd^2 =$ Pu−Pd.

Figure 7:
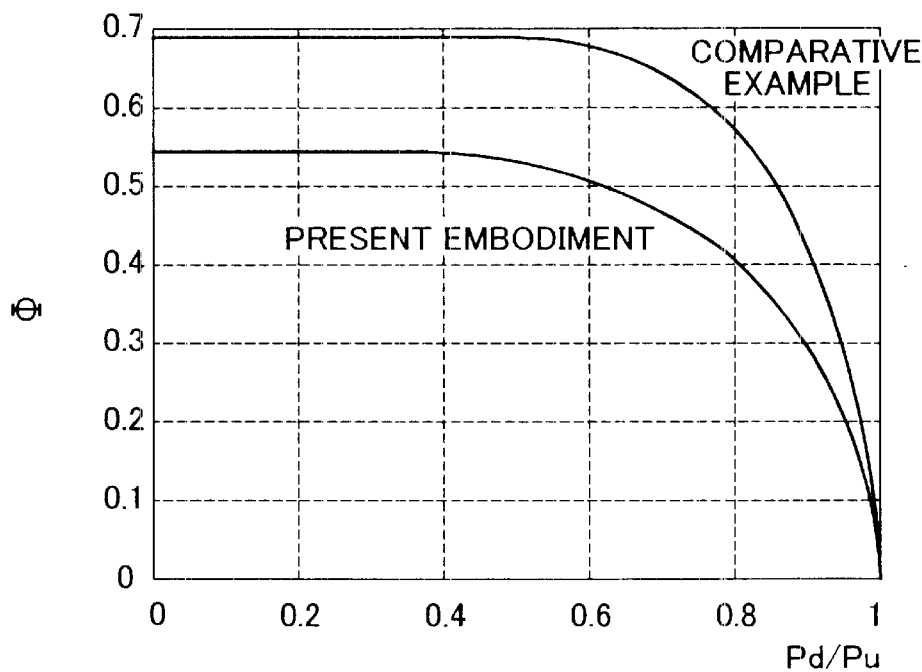
FIG. 7 is a graph showing the calculation formula in the flow amount calculation controller in FIG. 1.

Accordingly, as the amount mt of the air passing through the throttle, the formula (1) (in the case of a relation (Pd/Pu)>(1/(1+k)) is established) can be introduced. FIG. 7 is a graph showing φ(Pd/Pu) of the formula (1) in the flow amount calculation controller according to the present embodiment (in the case of a relation k=1.4 is established).

As mentioned above, in the flow amount calculation controller according to the present embodiment, the flow amount of the air passing through the throttle valve 23 in the intake pipe 20 is calculated by using the formula (1) introduced from the mass conservation rule (the formula (5)), the energy conservation rule (the formula (6)) and the momentum conservation rule (the formula (8)) without the assumption that the isentropic condition is established. Accordingly, it is possible to accurately calculate the flow amount of the air passing through the throttle valve 23 in which the isentropic condition is not always established. In this case, a method of the control executed based on the air flow amount obtained accordance to the calculating method is obtained by a known method.

(Second Embodiment)

Next, a flow amount calculation controller according to a second embodiment will be explained.

In the flow amount calculation controller according to the first embodiment, the description is given of the case where it is applied to the calculation of the amount of the air passing through the throttle valve 23 in the intake pipe 20 of the engine 2, however, the flow amount calculation controller according to the present embodiment is a flow amount calculation controller for calculating a flow amount of fluid passing through a variable throttle portion provided in the air passage, and is applied to the case where the variable throttle portion is a duty control valve.

For example, the flow amount calculation controller according to the present embodiment is applied for calculating a flow amount by using the aforementioned formula (1) in the case where a control valve such as an EGR valve, a purge control valve or the like is repeatedly turned on and off so as to be duty controlled and the flow amount of the fluid is adjusted.

In this case, when a control frequency of the duty control is smaller than a calculated frequency of the flow amount, the flow amount is calculated by substituting an actual opening area for the opening area Ad in the formula (1).

Figure 8:
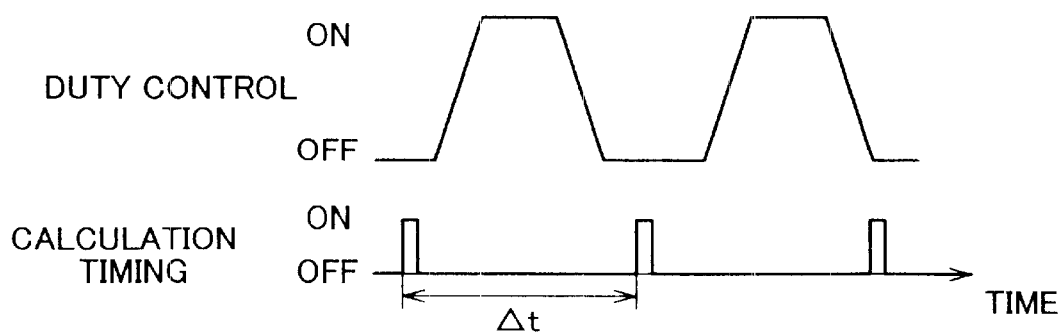
FIG. 8 is a schematic view of a flow amount calculation controller according to a second embodiment.

On the contrary, as shown in FIG. 8, when the control frequency of the duty control is greater than the calculated frequency of the flow amount, the opening area Ad in the formula (1) is set on the basis of a duty ratio of the duty control. That is, an average opening area at a calculated time interval Δt is used as the opening area Ad, and the flow amount is calculated.

In the flow amount calculation controller according to the present embodiment mentioned above, it is possible to calculate the flow amount in the same manner as that of the flow amount calculation controller according to the first embodiment, so that it is possible to accurately calculate the flow amount of the fluid passing through the variable throttle portion.

As mentioned above, according to the invention, since the flow amount of the fluid is calculated without relation to the relational expression of an adiabatic change, it is possible to accurately calculate the flow amount of the fluid under the condition where the isentropic condition is not established.

In the illustrated embodiment, the controller (the ECU 6) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A flow amount calculation controller for calculating a flow amount of fluid passing through a variable throttle portion provided in an air passage so as to control a certain subject comprising:

a calculator that calculates a flow amount mt of the fluid passing through said variable throttle portion by the following formula:

$$mt = Ad \cdot (Pu \cdot \rho u)^{1/2} \cdot ((((k-1)/(2 \cdot k)) \cdot (1 - Pd/Pu) + Pd/Pu) \cdot (1 - Pd/Pu))^{1/2}$$

where Pu is an upstream pressure of said variable throttle portion, $\rho u$ is an upstream density of said variable throttle portion, Pd is a downstream pressure of said variable throttle portion, Ad is an opening area of said variable throttle portion, and k is a specific heat ratio of said fluid.

2. A flow amount calculation controller according to claim 1, wherein said calculator calculates the flow amount mt of said fluid by using the following formula:

$$mt = Ad \cdot (Pu \cdot \rho u)^{1/2} \cdot \phi(Pd/Pu)$$

where a function $\phi(Pd/Pu)$ is $(k/(2 \cdot (k+1)))^{1/2}$ when a relation $(Pd/Pu) \leq (1/(1+k))$ is established, and is $((((k-1)/(2 \cdot k)) \cdot (1 - Pd/Pu) + Pd/Pu) \cdot (1 - Pd/Pu))^{1/2}$ when a relation $(Pd/Pu) > (1/(1+k))$ is established.

3. A flow amount calculation controller according to claim 1, wherein said variable throttle portion is provided in an intake passage of an internal combustion engine, and a value obtained by a table set on the basis of a throttle opening, an engine speed and a valve timing of the internal combustion engine is used for calculating the flow amount in said calculator.

4. A flow amount calculation controller according to claim 1, wherein said downstream pressure is obtained by measuring a pressure within said air passage.

5. A flow amount calculation controller according to claim 1, wherein said downstream pressure is estimated by a flow meter provided in said air passage.

6. A flow amount calculation controller according to claim 1, wherein said variable throttle portion is a throttle valve provided in an internal combustion engine.

7. A flow amount calculation controller according to claim 1, wherein said variable throttle portion is a duty control valve structured such that said opening area is controlled based on a duty ratio.

8. A flow amount calculation control method for calculating a flow amount of fluid passing through a variable throttle portion provided in an air passage so as to control a certain subject comprising:

a step of controlling the certain subject based on a flow amount mt of the fluid passing through said variable throttle portion calculated by the following formula:

$$mt = Ad \cdot (Pu \cdot \rho u)^{1/2} \cdot ((((k-1)/(2 \cdot k)) \cdot (1 - Pd/Pu) + Pd/Pu) \cdot (1 - Pd/Pu))^{1/2}$$

where Pu is an upstream pressure of said variable throttle portion, $\rho u$ is an upstream density of said variable throttle portion, Pd is a downstream pressure of said variable throttle portion, Ad is an opening area of said variable throttle portion, and k is a specific heat ratio of said fluid.

9. A flow amount calculation control method according to claim 8, wherein said control method controls the certain subject based on the flow amount mt of said fluid calculated by using the following formula:

$$mt = Ad \cdot (Pu \cdot \rho u)^{1/2} \cdot \phi(Pd/Pu)$$

where a function $\phi(Pd/Pu)$ is $(k/(2 \cdot (k+1)))^{1/2}$ when a relation $(Pd/Pu) \leq (1/(1+k))$ is established, and is $((((k-1)/(2 \cdot k)) \cdot (1 - Pd/Pu) + Pd/Pu) \cdot (1 - Pd/Pu))^{1/2}$ when a relation $(Pd/Pu) > (1/(1+k))$ is established.

10. A flow amount calculation control method according to claim 8, wherein said variable throttle portion is provided in an intake passage of an internal combustion engine, and a value obtained by a table set on the basis of a throttle opening, an engine speed and a valve timing is used for calculating the flow amount in said control method.

11. A flow amount calculation control method according to claim 8, wherein said downstream pressure is obtained by measuring a pressure within said air passage.

12. A flow amount calculation control method according to claim 8, wherein said downstream pressure is estimated by a flow meter provided in said air passage.

13. A flow amount calculation control method according to claim 8, wherein said variable throttle portion is a throttle valve provided in an internal combustion engine.

14. A flow amount calculation control method according to claim 8, wherein said variable throttle portion is a duty control valve structured such that said opening area is controlled based on a duty ratio.

* * * * *